United States Patent
Duym et al.

(10) Patent No.: US 11,656,084 B2
(45) Date of Patent: May 23, 2023

(54) METHOD AND DEVICES FOR DETERMINING ROUTES FOR ROUTING A VEHICLE

(71) Applicant: Bayerische Motoren Werke Aktiengesellschaft, Munich (DE)

(72) Inventors: Stefaan Duym, Munich (DE); Dominik Jain, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 277 days.

(21) Appl. No.: 17/268,420

(22) PCT Filed: Aug. 9, 2019

(86) PCT No.: PCT/EP2019/071469
§ 371 (c)(1),
(2) Date: Feb. 12, 2021

(87) PCT Pub. No.: WO2020/035416
PCT Pub. Date: Feb. 20, 2020

(65) Prior Publication Data
US 2021/0341302 A1    Nov. 4, 2021

(30) Foreign Application Priority Data
Aug. 14, 2018    (EP) .................................... 18188892

(51) Int. Cl.
*G01C 21/34*    (2006.01)
(52) U.S. Cl.
CPC ..... *G01C 21/3453* (2013.01); *G01C 21/3423* (2013.01); *G01C 21/3446* (2013.01)

(58) Field of Classification Search
CPC ............ G01C 21/3453; G01C 21/3423; G01C 21/3446; G01C 21/3407
See application file for complete search history.

(56) References Cited

U.S. PATENT DOCUMENTS

2012/0161984 A1    6/2012 Amir
2014/0214319 A1    7/2014 Vucetic et al.
(Continued)

FOREIGN PATENT DOCUMENTS

EP    2 587 220 A1    5/2013

OTHER PUBLICATIONS

PCT/EP2019/071469, International Search Report dated Oct. 28, 2019 (Two (2) pages).

*Primary Examiner* — Ryan Rink
(74) *Attorney, Agent, or Firm* — Crowell & Moring LLP (57) ABSTRACT

Methods for determining routes for routing vehicle include computing, in a digital map a route from route source to route destination. Such methods further include determining sub-route of the computed route, which ends at the destination and along which the vehicle could be parked. And such methods still further include extending the computed route beyond the route destination in area around the route destination until route parking probability of parking route, including links of the determined sub-route and/or of the extension of the computed route, is equal to or greater than predetermined threshold whilst total expected travel time, associated with the extended computed route and comprising driving and walking times, is minimized. The route parking probability is the probability that parking at some point along the extended computed route will be possible and wherein one or more links of the parking route are suitable for parking.

17 Claims, 8 Drawing Sheets

(56) References Cited

U.S. PATENT DOCUMENTS

| | | | |
|---|---|---|---|
| 2014/0266800 A1* | 9/2014 | Koukoumidis | G08G 1/0129 |
| | | | 340/932.2 |
| 2015/0254611 A1* | 9/2015 | Perez | G06Q 10/08355 |
| | | | 705/5 |
| 2017/0191849 A1 | 7/2017 | Agam et al. | |
| 2018/0274930 A1* | 9/2018 | Wisbrun | G01C 21/3407 |
| 2019/0376810 A1* | 12/2019 | Prokhorenkov | G01C 21/3453 |
| 2020/0011671 A1* | 1/2020 | Puri | G01C 21/3492 |
| 2020/0250592 A1* | 8/2020 | Perez | G06Q 10/08355 |
| 2020/0370916 A1* | 11/2020 | Cajias | G01C 21/3446 |
| 2021/0010824 A1* | 1/2021 | Muraleev | G01C 21/3685 |

\* cited by examiner

METHOD AND DEVICES FOR DETERMINING ROUTES FOR ROUTING A VEHICLE

BACKGROUND AND SUMMARY OF THE INVENTION

The present invention is directed to devices and methods arranged to determine routes for routing a vehicle.

Many known routing methods and devices exist that determine route proposals between a route source and a route destination. For determining route proposals, different criteria are taken into account. Typical criteria comprise, for example, travel time, length of the route, fuel consumption etc. One of most frequently used criterions is the total travel time, as it is desired to arrive at the route destination as quickly as possible.

However, when arriving at the route destination, the driver has to park the vehicle, and the search for a parking space may, depending on the destination, be time-consuming. Furthermore, once the vehicle has been parked, the passengers need to walk to the actual destination, which takes additional time. Current routing methods either do not consider this circumstance or fail to calculate routes with parking possibilities in an optimal (or near-optimal) way. Particularly in challenging scenarios involving dense road networks with mostly very low parking probabilities, existing methods often fail, producing poor solutions with high expected travel times or not producing any solution at all within a reasonable time frame. It has to be noted that computation of optimal routes still requires too much computing and storage resources and is still inefficient.

Therefore, there is still a need for methods and devices for determining routes for routing a vehicle that efficiently and reliably determine at least nearly optimal routes for the case where the driver needs to search for parking in the vicinity of the destination, taking both the additional drive times as well as walk times into consideration.

An object of the present invention is to provide improved methods and devices for determining/calculating routes for routing a vehicle in an efficient and computing and storage resource saving way. The determined routes include parking routes. Further, the present invention allows computation of routes with at least nearly optimally minimized expected travel times, including drive as well as walk times. Further, the present invention provides mechanisms for sensibly controlling the consumption of the computing and storage resources and of the performance of the route determining method and device.

Advantageous implementations of the present invention are further disclosed herein.

According to at least one embodiment, a method for determining routes for routing a vehicle is provided, the method comprising: computing, in a digital map, a route from a route source to a route destination; determining a sub-route of the computed route, which ends at the destination and along which the vehicle could be parked; and extending the computed route beyond the route destination in an area around the route destination until a route parking probability of a parking route, comprising links of the determined sub-route and/or of the extension of the computed route, is equal to or greater than a predetermined threshold whilst a total expected travel time, associated with the extended computed route and comprising driving and walking times, is minimized, wherein the route parking probability is the probability that parking at some point along the extended computed route will be possible and wherein one or more links of the parking route are suitable for parking. The minimizing of the total expected travel time means that the total expected travel time of the extended computed route is as short as possible in comparison to further possible/candidate extensions of the computed route.

According to an embodiment, the total expected travel time is a probabilistic expectation comprised of driving times from the route source to potential parking locations and walking times from the potential parking locations to the route destination.

According to an embodiment, the determining of the sub-route comprises starting at the route destination and link-wise moving back in the computed route towards the route source, wherein, when link-wise moving back in the computed route, at each corresponding link of the computed route, a respective route parking probability of being able to park at some point along the computed route from the corresponding link to the destination and a respective distance from a predecessor of the corresponding link in the computed route to the route destination are computed, wherein the link-wise moving back is terminated and the corresponding link is selected as an appropriate start link of the sub-route if the respective route parking probability is greater than or equal to a desired route parking probability or if the respective distance is greater than a first predetermined threshold distance. According to an embodiment, the desired route parking probability is a threshold. According to a further embodiment, the desired route parking probability is predetermined.

According to an embodiment, the extending of the computed route is executed based on a tree search variant of a best-first search.

According to an embodiment, the extending of the computed route is executed starting from the route destination.

According to an embodiment, the extending of the computed route comprises limiting a search space in the digital map to links around the route destination.

According to an embodiment, the limiting of the search space in the digital map to links around the route destination comprises limiting to links whose start positions and end positions are within a second predetermined threshold distance of the route destination.

According to an embodiment, a computing of the route parking probability comprises reducing a link parking probability of a link if it has been previously used within the same parking route, the reduction depending on the time that has passed since the last usage.

According to an embodiment, the route parking probability being a probability of parking at some point along the parking route R, is determined as follows:

$$r(R) = \sum_{i=1}^{|R|} q(R, i),$$

wherein |R| denotes a number of links of the parking route R, and q(R, i) denotes a route link probability that, when traveling along the parking route R, vehicle will be parked on the i-th link of the parking route R.

According to an embodiment, the route link probability q(R, i) that, when traveling along the parking route R, the vehicle will be parked on the i-th link of the parking route R is determined as follows:

$$q(R, i) = p(R, i)\prod_{j=1}^{i-1}(1 - p(R, j)),$$

wherein p(R, i) denotes a link probability that a parking space will be available on the i-th link of the parking route R, and wherein p(R, j) denotes a link probability that a parking space will be available on the j-th link of the parking route R.

According to an embodiment, the link parking probability that a parking space is available and considered usable on the i-th link is determined as follows, $$p(R,i)=p_{R_i}w_p(R,i),$$

wherein $p_{R_i}$ denotes the probability with which a free parking space is expected to be available on the i-th link of route R, and wherein $w_p$ (R, i) indicates the degree to which the probability $p_{R_i}$ should be applied with regard to the route.

According to an embodiment, the extending of the computed route comprises applying a priority function $f(R)$ for a best-first search, which, by defining the order in which candidate routes are considered during the search, guides the search in order to find routes with short total travel times, the total travel times including both the drive time and the walk time from the potential parking locations to the route destination.

According to an embodiment, a value of the priority function $f(R)$ is a lower bound on the expected travel duration implied by route R, such as $$f(R) = \sum_{i=1}^{|R|} q(R, i)(t_{DrivePark}(R, i) + t_{Foot}(R, i)) + (1 - r(R))t_{Drive}(R, |R|),$$

wherein $t_{DrivePark}(R, i)$ is the total travel time on route R for the case where it is assumed to park on the i-th link, $t_{Foot}(R, i)$ is the walk time from the i-th link in R to the route destination and $t_{Drive}$ (R, |R|) is the drive time required for the entire route R.

According to an embodiment, a value of the priority function $f(R)$ is an estimate of time expected to be "wasted" when choosing route R, being $$f(R) = \sum_{i=1}^{|R|}(1 - p(R, i))(t_{Drive}(R, i) - t_{Drive}(R, i - 1) + t_{Foot}(R, i)),$$

wherein $t_{Drive}(R, i)$ is the drive time on route R up to the end of the i-th link, wherein $t_{Drive}(R, 0)$ is defined to be 0 for all R, wherein $t_{Foot}(R, i)$ is the walk time from the i-th link in R to the route destination.

According to an embodiment, the extending of the computed route comprises truncating a fringe of a best-first search, wherein the fringe comprises a set of candidate routes that could be explored next, and wherein the truncating of the fringe comprises deleting routes from the fringe that are associated with a lowest route parking probability, if the set of nodes of the fringe is larger than a predetermined fringe size threshold.

According to an embodiment, the extending of the computed route comprises omitting a consideration of a potential route R and preventing an addition of the potential route R to the fringe if another route has been previously found which ends in the same point as R and is associated with a route parking probability that is at least as high as the route point probability of the potential route R.

According to at least one embodiment, a device is provided that is configured to determine routes for routing a vehicle, wherein the device is further configured to execute steps of the method for determining routes for routing vehicles as described herein.

The route determination for routing a vehicle provides routes that are optimized with regard to the travel time, i.e. the drive time (including the drive time required to find parking) and the walk times from the parking location to the actual destination. The parking route determination is applied in an efficient and computing and storage resource saving way. As described herein, different mechanisms can be applied according to the present invention to reduce the data to be analyzed and/or to reduce the number of processing tasks, and thus to improve the efficiency of the route determination methods and devices and to save computing and storage resources of the route determination methods and devices.

BRIEF DESCRIPTION OF DRAWINGS

The above-described aspects and implementation forms of the present invention will be explained in the following description of specific embodiments in relation to the enclosed drawings, in which.

DETAILED DESCRIPTION OF THE DRAWINGS

Generally, it has to be noted that all arrangements, devices, modules, components, models, elements, units, entities, and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present invention and its various steps are embodied in the functionalities of the various described apparatus elements.

Moreover, any of the embodiments and features of any of the embodiments, described herein, may be combined with each other, unless a combination is explicitly excluded.

The routing method and the routing device, described herein, take into account the necessity of parking at/near the destination. Especially in urban areas, finding a parking space at the destination is often a difficult task because of dense road networks in urban areas, and it is, therefore, frequently necessary to extend the route beyond the destination in order to find parking. This also has an impact on the estimated time of arrival, as the driver may need to drive longer and, if it is not possible to park in the immediate vicinity of the destination, may have to account for longer walking times as well. Given a model or service that provides, for any link in the digital map used for routing, the probability with which parking is possible on the link, the estimated time of arrival becomes a probabilistic expectation. The routing method and the routing device described herein take this into account. Generally, the routing method and the routing device solve two distinct problems: (1) finding a route to the destination and identifying the point along the route at which the search for a parking space should begin, and (2) finding a route beyond the destination that is suitable for finding a parking space.

Figure 1:
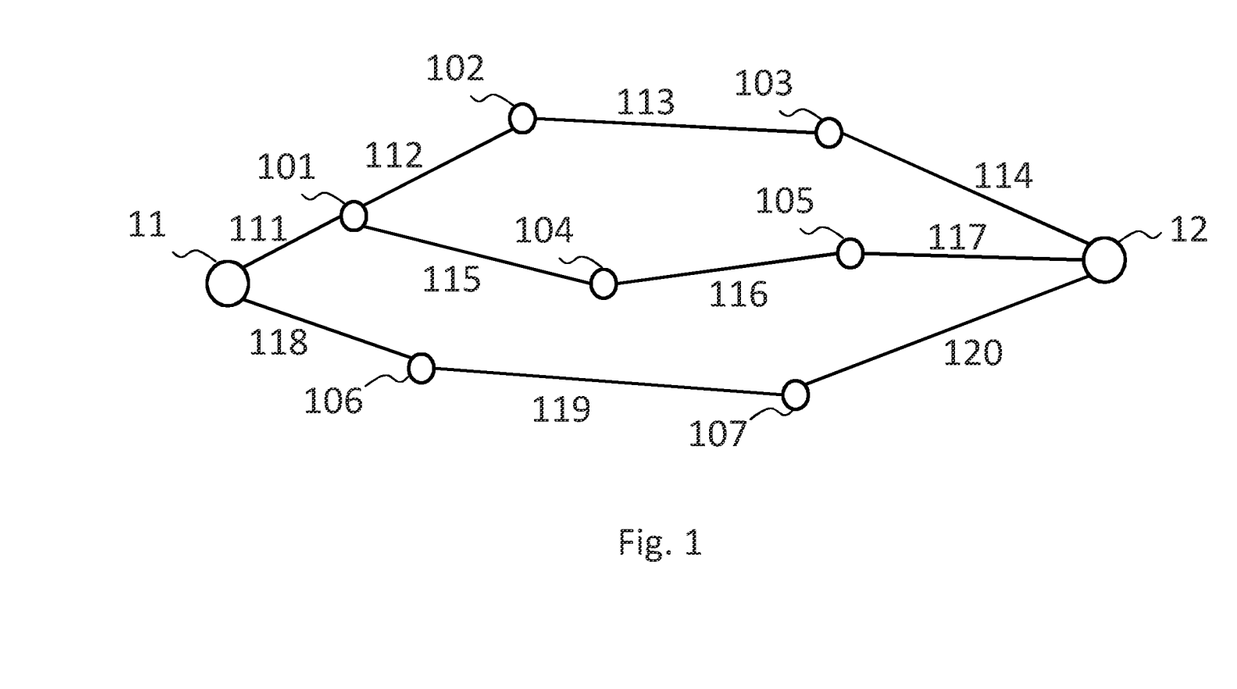
FIG. 1 shows three possible routes from a route source to a route destination according to an embodiment of the present invention.

FIG. 1 shows three possible routes, as examples, from a route source 11 to a route destination 12 according to an embodiment of the present invention. The first route comprises links 111, 112, 113, and 114 connecting nodes 11, 101, 102, 105, and 12. The second route comprises links 111, 115, 116, 117 connecting nodes 11, 101, 104, 105, and 12. The third route comprises links 118, 119, and 120 connecting nodes 11, 106, 107, and 12. While one of the three routes may appear to be longer, indeed it may have the shortest traveling time, e.g. because of the use of a highway. Thus, the best route will not be necessary the shortest one, further search criteria have to be applied. In the following, description of best-first search is provided, which may be used for calculating a route from the route source 11 to the route destination 12 and/or for calculating a parking route.

Figure 2A:
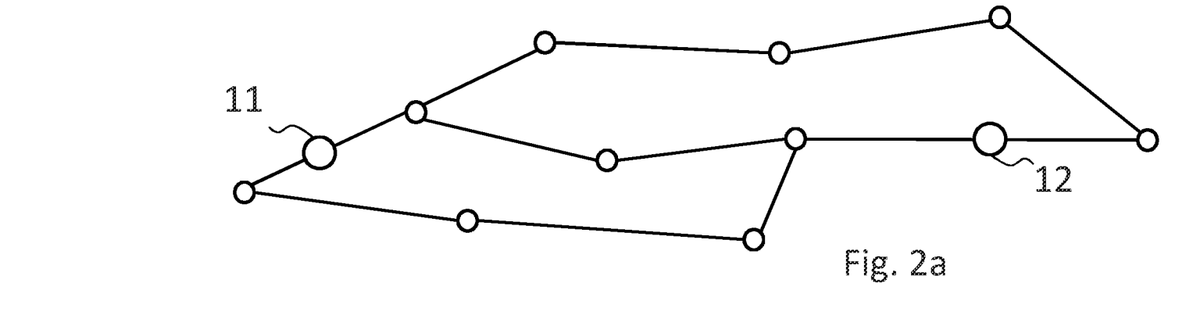
FIG. 2a shows a road graph or network with a route source and a route destination according to an embodiment of the present invention.
Figures 2B, 2C:
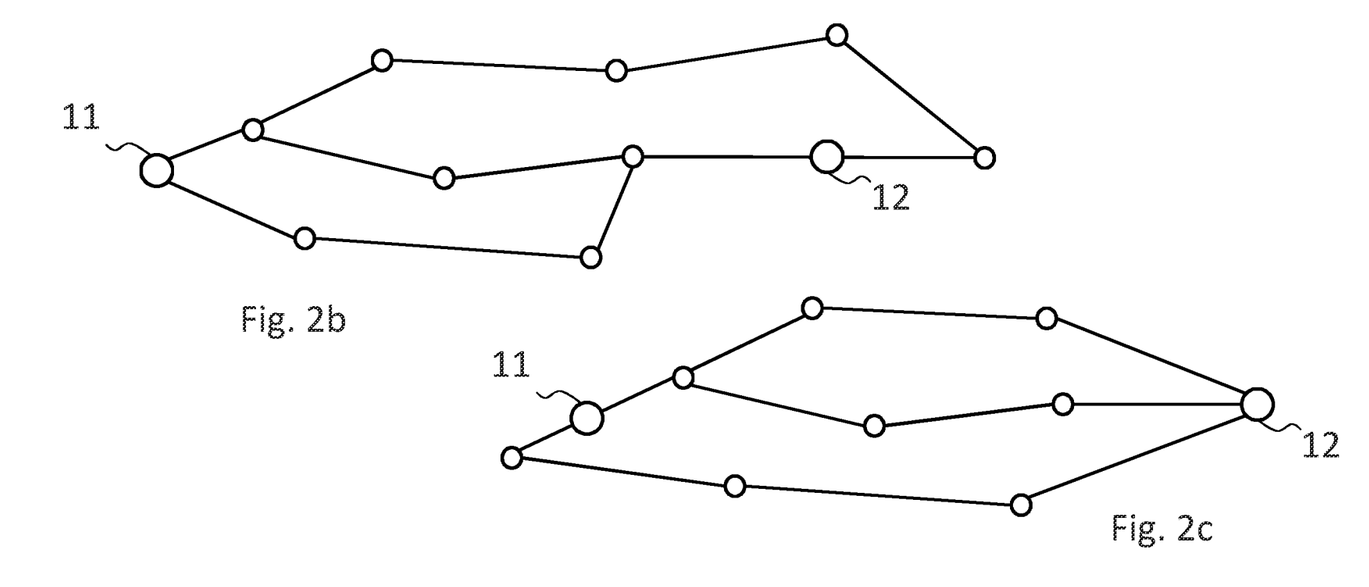
FIG. 2b shows a road graph or network with a route source and a route destination according to an embodiment of the present invention.
FIG. 2c shows a road graph or network with a route source and a route destination according to an embodiment of the present invention.

Here, it has to be noted that the route source 11 and/or the route destination 12 do not necessarily represent end nodes of a link in a road graph or network respectively. Because a route source 11 and/or a route destination 12 are not necessarily located at a road intersection, the route source 11 and/or the route destination 12 may be points of a link. This is exemplary shown in FIGS. 2a, 2b, and 2c.

Generally, best-first search is a well-known methodology. As shown in FIG. 1, the road network corresponds to a graph, which induces a set of routes that make up the search space of a routing problem. Therefore, for a route search starting from one or several start locations, a tree- or forest-structured search space $\mathcal{N}$ of nodes is considered, where each node corresponds to a route. A solution is found if a node is visited during the search that satisfies some goal criterion. The concrete behavior of the search is mainly characterized by the way in which it prioritizes nodes that are to be visited and expanded. In each stage of the search, the node that is visited and expanded is selected from the set of (yet unvisited) successors of nodes that have been previously visited, the so-called fringe. Initially, the fringe is made up of the node(s) where the search is started. The process of expansion is simply the process of adding the visited node's successors to the fringe.

Referring to FIG. 1, a route from node 11 to node 12 is searched. The search starts with node 11 (route source), i.e. the initial fringe is made up of a single route, an empty route starting at node 11. Hence the route is removed from the fringe, is visited and checked for the goal condition, and is subsequently expanded, i.e. its successors, the routes extended with edges 111 and 118 leading to nodes 101 and 106 respectively, are added to the fringe. The route visited next is not selected arbitrarily but according to their prioritization according to criteria that the determined route has to meet, as formalized by a priority function. Suppose the priority function assigns higher priority to the route ending leading to 101. Consequently, the route is removed from the fringe, is visited and its successors are added to the fringe, i.e. in case of FIG. 1 the routes extended with edges 112 and 115 leading to nodes 102 and 104 respectively. At this stage, the fringe will be comprised of the three routes ending in nodes 106, 102 and 104. The search continues until the goal of the search, e.g. having found a route that leads to node 12 (route destination), has been reached. Generally, the use of fringes in route or path search is known to the skilled person.

Figure 3:
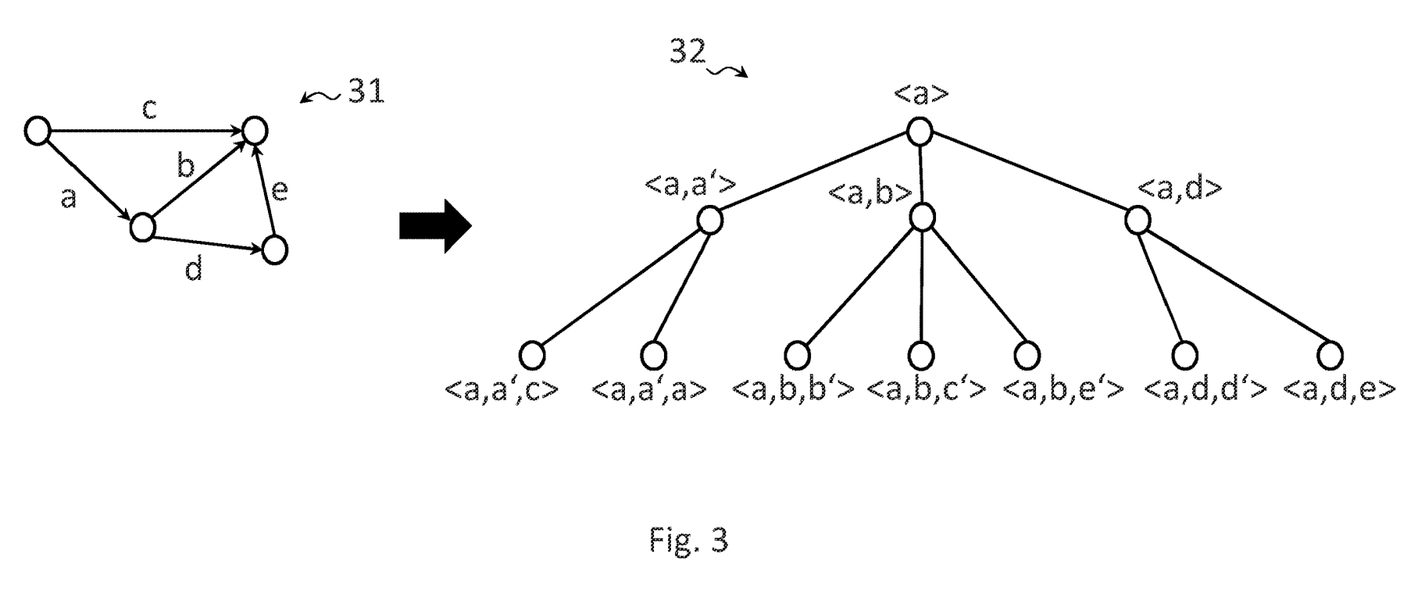
FIG. 3 shows an exemplary search tree, on which route search is executed according to an embodiment of the present invention.

FIG. 3 shows a search tree, for example, on which the route search is executed according to an embodiment. On the left side of FIG. 3, an exemplary route graph 31 is shown with links/edges a, b, c, d, and e. Said links/edges a, b, c, d, and e are shown exemplary as being directed for being able to visualize in resulting search tree 32 the respective opposite direction of said links/edges a, b, c, d, and e being denoted as a', b', c', d', and e'. Thus, the roads represented by the links/edges a, b, c, d, and e are not one-way roads but are drivable in both directions in the embodiment of FIG. 3. The road graph 31 is the basis for the search tree 32, i.e. the search tree 32 is built based on the road graph 32. According to the exemplary embodiment of FIG. 3, the search starts with link/edge a being traversed in the forward direction and represents the root of the search tree 32. At the next level of the search tree 32, further driving possibilities are added, i.e. continuing links/edges are added to the route <a> of the root node of the search tree 32. Here, also the reverse links/edges, i.e. links/edges leading in the backward direction, are added. This can be seen from the route <a,a'>. Then in the next level, the addition of connected links/edges is continued, as can be seen from the route nodes <a,a',c>, <a,a',a>, <a,b,b'>, <a,b,c'>, <a,b,e'>, <a,d,d'>, <a,d,e> of the exemplary search tree 32 of the embodiment of FIG. 3.

In best-first search, the priority of expansion is defined by a function $f: \mathcal{N} \to \mathbb{R}$, which assigns real-valued priorities to nodes. High priority is indicated by low values. The function $f$ is referred to as the priority function. Therefore, if the current fringe is given by $\mathcal{F}$, the node that is visited next is the node with the lowest priority value $$\arg\min_{n\in\mathcal{F}} f(n). \quad (1)$$

In the case of equal priorities (non-unique minimum), arbitrarily picking/selecting among the nodes with the lowest priority value is executed, e.g. selecting a node that was first added to the fringe.

Generally, the following two search variants are distinguished: tree search and graph search. Since the search space is induced by a road map, nodes are associated with positions on the map. In graph search, a list of visited places (referred to also as "closed list") is managed in order to ensure that every place is visited at most once. There is at most one visited node for every place on the map. In tree search, no such restrictions are imposed and re-visiting of places is allowed (see, e.g., FIG. 3). Two nodes may then correspond to the same place on the map but can have different routes (in particular, routes of different lengths) leading up to them.

A concrete search problem is defined by one or more nodes from which the search is to begin, a function which defines the search space by providing the successors of any given node, and a goal, i.e. a condition which, when satisfied by a node that is visited, ends the search. The result of the search is typically the node, for which the goal test was true. For routing problems, the search space $\mathcal{N}$ is the set of all routes, and therefore the selected route is the first one, for which the goal test is satisfied. If good routes are to be found, a desirable property of the priority function is therefore to prioritize "good" routes over "bad" routes. It is, therefore, sensible to think of or use the priority function as a cost function.

Given the above definitions, a best-first search-based method is sufficiently defined by the search variant it uses (tree or graph search) and the priority function. By defining these aspects in different ways, manifold search strategies may be implemented. Notable special cases of best-first search include breadth-first search, depth-first search, A* search, and uniform-cost search (Dijkstra's algorithm), which are well known and will not be described in more detail in the following.

Herein, the best-first search is generalized in order to (optionally) support strategies for:
  pruning paths, i.e. preventing the addition of nodes to the fringe or preventing the expansion of a visited node entirely, and
  truncating the fringe, i.e. removing some of the fringe's elements.

For example, the best-first search may be executed according to an embodiment of the present invention as shown in the following pseudo-code:

```
       bestFirstSearch (initialNodes, successors, goal)
 1:    C ← initial mutable computation context
 2:    fringe ← new fringe containing initialNodes
 3:    closedList ← empty collection
 4:    while ¬fringe.isEmpty( ) ∧ ¬searchEnded(C) do
 5:        n ← fringe.removeBest( )
 6:        if isGraphSearch then
 7:            if closedList.contains(state(n)) then continue
 8:            closedList.add(state(n))
 9:        if goal.isReached(n) then return result(n, C)
10:        if visitNode(n, C) then
11:            for n' ∈ successors(n) do
12:                if isGraphSearch ∧ closedList.contains(state(n')) then continue
13:                if ¬isPruned(n', C) then
14:                    fringe.add(f(n'), n')
15:            fringe ← truncateFringe(fringe)
16:    return result(null, C)
```

As shown in the above pseudo-code, used arguments are: a set of initial nodes, from which the search is to begin (usually just one node representing the starting point); the function successors, which defines the search space; and the goal of the search. All the functions and constants used within the above-provided pseudo-code that are not given as arguments collectively define the concrete behavior of the particular instance of the best-first search. The flag isGraphSearch indicates whether the graph search variant is applied. If it is true, a closed list of states is managed that have been visited in order to prevent the re-visitation of states (line 7) as well as to prevent the insertion of nodes into the fringe whose corresponding states have been previously visited (line 12). In the graph context, states will correspond to elements of the graph underlying the search space, i.e. the function state will, for a given search node n, return either the graph node that is reached in n or the last edge used to reach n. The mutable computation context, which is initialized in line 1, serves to manage state during the search. Any function that is passed the context may update it and/or use it to compute its result. The computation context can, for example, be used to prematurely end the search (line 4), in which case the result of the search will have to come from the context (line 16). Normally, the search ends when a node is visited that satisfies the goal test, in which case the result is given by the goal node or destination node itself (line 9), i.e. function result just returns n. The function visitNode can be used to update the context C whenever a node is visited, and its return value can be used to prevent the expansion of the current node n (line 10); in standard best-first search, the function always returns true. The function isPruned can be used to implement path pruning and thus prevent the addition of nodes to the fringe (line 13). Finally, the function truncateFringe can be used to modify the fringe after expansions (line 15), in particular to truncate it in order to reduce the set of nodes being considered. In a standard best-first search, isPruned always returns false and truncateFringe is the identity function.

In the following, some definitions of terms will be provided for better understanding of the present invention.

Let a set of links on the digital map (comprising a road graph or network respectively) be given by $\mathcal{L}$. Thus, when considering FIG. 1, all links/edges 111 to 120 are comprised in the set of links $\mathcal{L}$. A route is then simply a sequence of links, i.e. an element of $L^n$ for some $n \in \mathbb{N}$. FIG. 1, for example, contains two routes of length four (elements of $L^4$) that lead from node 11 to node 12: The first route is the sequence of links 111, 112, 113, and 114, and the second route is the sequence of links 111, 115, 116, and 117. The set of all routes is denoted by $\mathfrak{R}$, i.e. the subset of $\cup_{n \in \mathbb{N}} L^n$, which contains only admissible routes, where two consecutive links are connected in the map. Let $R = \langle R_1, \ldots, R_{|R|} \rangle$ be a route. We denote a partial route encompassing the first m elements by $R_{1 \ldots m} = \langle R_1, \ldots, R_m \rangle$ and similarly for other slices of the route R. Directed links are assumed, and the direction in which the i-th link in route R is traversed (forward or backward) is denoted by dir(R, i).

By $pos_{Start}(R, i)$, the geographic position at the start of the traversal of the i-th link in route R is denoted. Likewise, $pos_{End}(R, i)$ denotes the position at the end of the traversal. When exemplary considering FIG. 1, link 113 is the $3^{rd}$ link in the route $\langle 111, 112, 113, 114 \rangle$. $pos_{Start}(R, 3)$ denotes then with regard to said route in FIG. 1 the geographic position of node 102, and $pos_{End}(R, 3)$ denotes the geographic position of node 103.

Links being directed, the position where link $L \in \mathcal{L}$ begins is denoted by $pos_{Start}^{\mathcal{L}}(L)$, the position where the link $L \in \mathcal{L}$ ends is denoted by $pos_{End}^{\mathcal{L}}(L)$, and the middle location of link $L \in \mathcal{L}$ is denoted by $pos_{Mid}^{\mathcal{L}}(L)$.

For the case, where a route element $R_i$ is traversed in the backward direction within the route context, $pos_{Start}^{\mathcal{L}}(L) = Pos_{End}(R, i)$.

The straight-line distance between two positions x and y in the digital map is denoted by dist(x, y).

Let $p_L$ be the probability of being a parking space available on link $L \in \mathcal{L}$, as indicated by some model or service. Herein, the probability $p_L$ is referred to as "unscaled link parking probability". Here, a simplifying assumption is made that the probability is constant for a given link, but it would be straightforward to replace the constant by a function of time, for example. In the context of a route R generated by some routing method, an additional scaling is applied, and, thus, the probability of a parking space being available on the i-th link, which is considered/wanted/expected within the current route context, is computed as $$p(R,i) = p_{R_i} w_p(R,i) \qquad (2)$$

where $w_p$ is a function specific to the routing method, which maps to [0, 1], indicating the degree to which the probability $p_{R_i}$ is to be applied. In particular, function $w_p$ is defined such that $w_p(R,i)=0$ for the case where the parking search has not yet begun at the i-th link (e.g., because the vehicle is too far from the destination). However, also other things may be modeled based on the same notion of scaling the probability value given by the parking model, as described below.

Herein, the probability p(R, i) is referred to as "link parking probability".

The probability that, when travelling along the route R, the vehicle will be parked on the i-th link $R_i$ of the route is given by the following equation:

$$q(R,i) = p(R,i) \Pi_{j=1}^{i-1}(1-p(R,j)). \qquad (3)$$

Herein, the probability q(R, i) is referred to as "route link parking probability".

The probability that the vehicle will be parked at some point along the route R is determined as follows:

$$r(R) = \Sigma_{i=1}^{|R|} q(R,i). \qquad (4)$$

Herein, the probability r(R) is referred to as "route parking probability".

Here, it should be noted that r(R) is independent of the order, in which the links appear in the route R (backward and forward traversal are equivalent). Furthermore note that $\Pi_{j=1}^{i-1}(1-p(R,j)) = 1 - r(R_{1 \ldots i-1})$.

The partial expectation of the total travel time, which comprises both (i.e. a sum of) drive and foot walk times, is then given by:

$$t_e(R) = \Sigma_{i=1}^{|R|} q(R, i) \left[ t_{Drive}(R, i-1) + \frac{1}{2} t_{Drive}^{\mathcal{L}}(R_i) + t_{Foot}(pos_{Mid}^{\mathcal{L}}(R_i)) \right], \qquad (5)$$

where function $t_{Foot}$ returns the foot walk time (e.g., in seconds) from the given location to the destination and $t_{Drive}(R, i)$ is the total drive time (e.g., in seconds) for the route up to and including the i-th link, i.e.:

$$t_{Drive}(R, i) = \Sigma_{j=1}^{i} t_{Drive}^{\mathcal{L}}(R_j) = \Sigma_{j=1}^{i} \frac{l_{R_j}}{v_{R_j}}, \qquad (6)$$

where $l_{R_j}$ is the length (e.g., in metres) of the j-th link $R_j \in \mathcal{L}$ and $v_{R_j}$ is the expected vehicle traversal speed (e.g., in m/s).

It should be noted that with regard to the equation (5) an assumption is made that for the case where parking will be done on a given link, on expectation, only a half of that link will be traversed—based on the insight that the true probability model applies to individual parking spaces, the link-level granularity used by the predictive model being but an abstraction thereof. The quantities returned by $t_{Foot}$ can, for example, be determined by using a pedestrian router to find the shortest route and applying a computation analogous to equation (6). $t_e(R)$, as a partial expectation which does not cover the entire probability mass, can be used to estimate the expected time of arrival only if $r(R) \approx 1$. Otherwise, one would have to make assumptions about the missing probability mass $1-r(R)$.

Figure 4A:
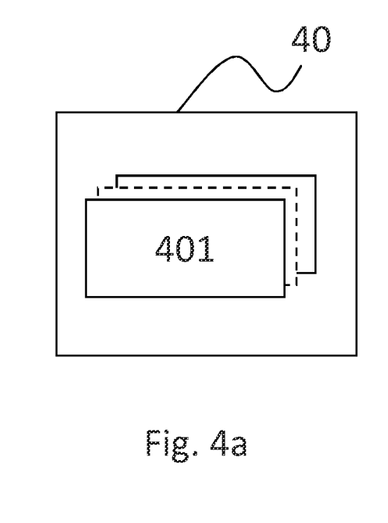
FIG. 4a shows an exemplary arrangement of a device configured to determine routes for routing a vehicle according to an embodiment of the present invention.

FIG. 4a shows an exemplary arrangement of a device 40 configured to determine routes for routing/navigating a vehicle according to an embodiment of the present invention. According to the embodiment of FIG. 4a, the device 40 comprises one or more processing units/components/means/entities (e.g., processors) 401 that are configured to execute any one of the steps for determining routes as described herein. Thus, the device 40 is a computing device.

Figure 4B:
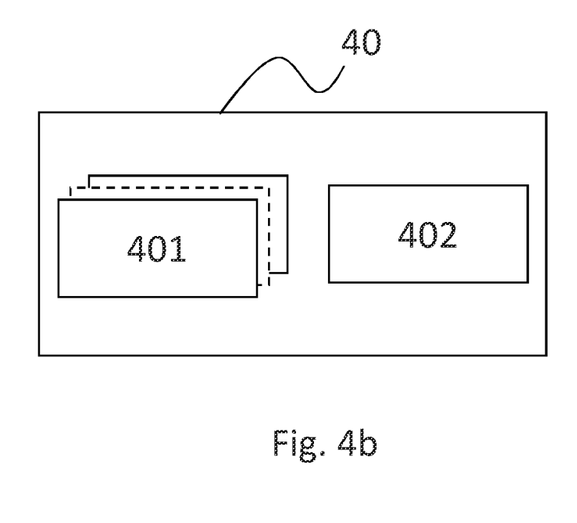
FIG. 4b shows a further exemplary arrangement of a device configured to determine routes for routing a vehicle according to an embodiment of the present invention.

FIG. 4b shows a further exemplary arrangement of a device 40 configured to determine routes for routing/navigating a vehicle according to an embodiment of the present invention. According to the embodiment of FIG. 4b, the device 40 comprises, besides the one or more processing units/components/means/entities 401, a display unit/component/means/entity 402 configured to display information on the determined routes, digital map, and/or determined routes on the map.

The device 40 as exemplarily shown in FIGS. 4a and 4b may comprise also any further units/components/means/entities. For example, according to an embodiment, the device 40 comprises one or more receiving units/components/means/entities arranged to receive information, e.g. information on digital maps, information on roads, and/or any further relevant information. According to a further embodiment, the device 40 comprises one or more transmitting units/components/means/entities arranged to transmit information or data, e.g. requests for clearance values, requests for digital map information, requests for road information, and/or any further information or data. Here, different appropriate arrangements of the device 40 are possible.

As mentioned, the device 40 is configured to execute any one of the steps for determining routes for routing/navigating a vehicle as described herein. Particularly, the device 40 is configured to execute any one of the steps for determining routes for routing/navigating a vehicle as described in the following. According to an embodiment, the one or more processing units/components/means/entities 401 are configured to execute any one of the steps for determining routes for routing/navigating a vehicle as described in the following.

According to an embodiment of the present invention, the goal of the search is to find a route R that leads from a route source 11 to a route destination 12 and to identify the point along the route where the driver shall begin his search for a parking space.

Figure 5:
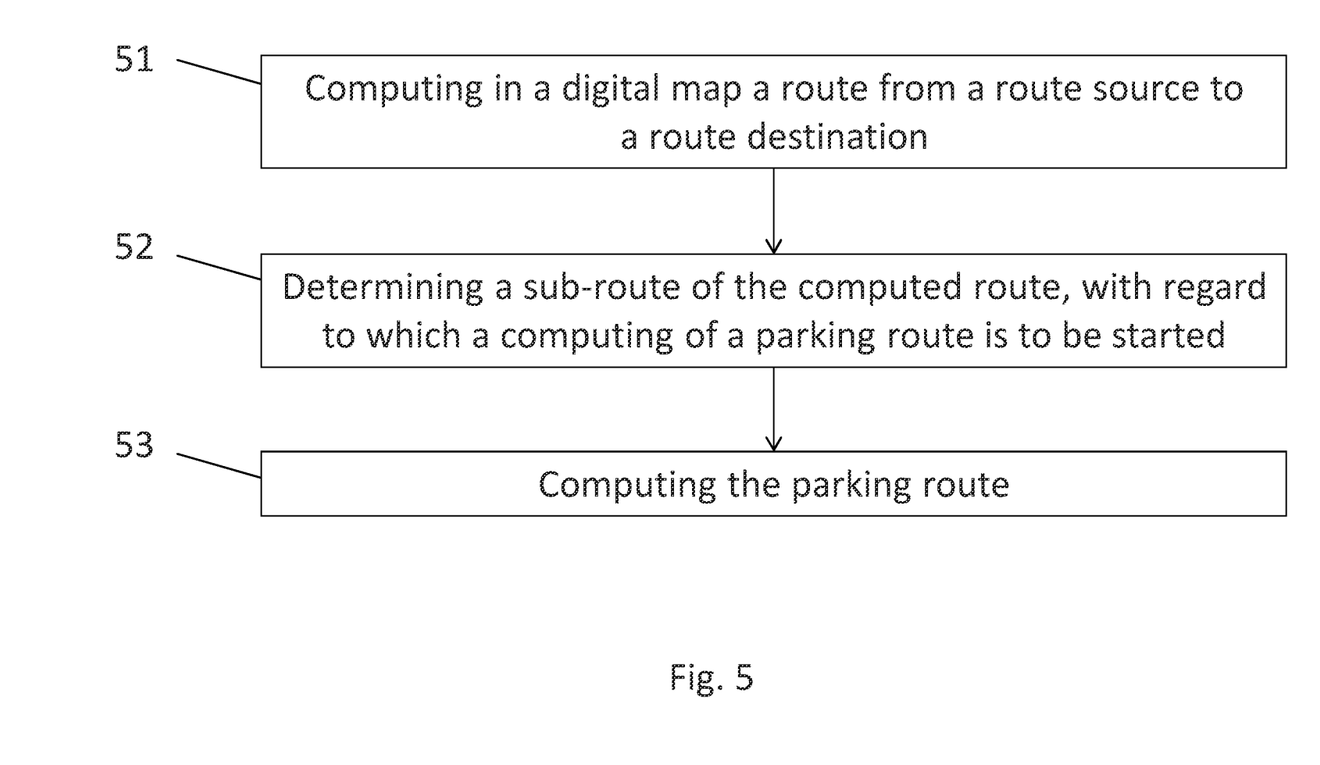
FIG. 5 shows steps executed for determining routes for routing a vehicle according to an embodiment of the present invention.

FIG. 5 shows steps executed for determining routes for routing a vehicle according to an embodiment of the present invention. As mentioned above, said steps are executable by the device 40 or the one or more processing units/components/means/entities (e.g., processors) 401 respectively.

In step 51, a route from route source 11 to route destination 12 is computed in a digital map. The geographic location of the route destination 12 is given by $pos_{Dest}$. To find a route to the route destination or $pos_{Dest}$ respectively, any appropriate route determination method can be used. For example, A* search, which is well known to the skilled person, can be used to determine the fastest route R. However, the present invention is not restricted to the A* search and any appropriate route determination method can be used. According to an embodiment where the A* search is used, the A* search for the fastest route is given by the graph-search variant of best-first search with the following priority function:

$$f(R) = g(R) + h(R), \quad (7)$$

where g(R) denotes path costs accumulated by R and h(R) denotes a consistent heuristic function estimating the costs required to reach the route destination 11 from the end of route R. Specifically, the two functions are given by the following equations:

$$g(R) = t_{Drive}(R, |R|) \quad (8)$$

$$h(R) = \frac{dist(pos_{End}(R, |R|), pos_{Dest})}{v_{max}} \quad (9)$$

wherein $v_{max}$ denotes the maximum travel speed that can be assumed for the vehicle. If $L_{Dest} \in \mathcal{L}$ is the destination link (i.e., a link leading to the destination 12), the goal test is simply asking whether $$R_{|R|} = = L_{Dest} \quad (10)$$

i.e. whether the last link of the route R is the destination link.

After computing the route from the route source 11 to the route destination 12 in step 51, in step 52, a sub-route of the computed route determined, along which parking search is to be started. The sub-route is determined by starting with the route destination 12 (given by $pos_{Dest}$) and by link-wise moving back in the computed route towards the route source 11, wherein an appropriate start link in the computed route is determined, starting from a starting position of which the parking search is to be started.

Let R* be the route found by using the above search method and let N=|R*|. In order to find the appropriate start link, i.e. the point at which the search for a parking space should be started along the route R*, it is sought to ideally achieve some route parking probability $r_p$ prior to reaching the destination 12—yet without causing excessive foot walk times. Foot walk distances as considered to be excessive if the straight line distance to the destination exceeds some predetermined threshold distance $d_{max}^{(1)} \Pi \mathbb{R}^+$. According to an embodiment, the route parking probability $r_p$ is set to 0.5 (i.e., $r_p := 0.5$) such that the parking route can be approximately "centered" around the destination in cases where the route parking probability $r_p$ can be achieved, keeping foot walk times to an acceptable minimum.

Formally, the goal is to find the sub-route $R^*_{i_p \ldots N}$, along which the user is to seek parking. We find the start index $i_p$ as the greatest index at which the desired route parking probability $r_p$ has been reached or at which the maximum distance to the destination would be exceeded when incorporating the next link into the sub-route, i.e.

$$i_p = \max\{i \in \{1, \ldots, N\} | r(R^*_{i \ldots N}) \geq r_p \lor (i > 1 \Rightarrow dist(pos_{Start}(R^*, i-1), pos_{Dest}) > d_{max}^{(1)})\} \quad (11)$$

Thus, index $i_p$ indicates the appropriate start link $R^*_{i_p}$ the computed route R*, starting from a starting position of which (i.e. $pos_{Start}(R^*, i_p)$) the parking search is to be started.

Thus, when considering the route (111, 115, 116, 117) of FIG. 1, at first, the last link 117 will be examined with regard to the criteria outlined above (see the above equation (11) and the respective description). Then, if the criteria are not met, the next link 116 towards the route start will be examined with regard to the criteria. The procedure continues until one of the conditions has been met. For example, if link 115 is determined as the appropriate start link $R^*_{i_p}$, then it shall be attempted to park the vehicle along the sub-route <115, 116, 117> to the destination.

Thus, at each corresponding link of the previously computed route, a respective route parking probability of being able to park at some point along the computed route from the corresponding link to the destination 12 and a respective distance from predecessor of the corresponding link in the computed route to the route destination 12 are computed, wherein the link-wise moving back is terminated and the corresponding link is selected as an appropriate start link $R^*_{i_p}$ of the sub-route $R^*_{i_p}$ if the respective route parking probability is greater than or equal to a desired route parking probability, i.e. $r_p$ or if the respective distance is greater than a first predetermined threshold distance, i.e. $d_{max}^{(1)}$.

After executing step 52 or at the end of the execution of the step 52, particularly after determining $i_p$, values associated with the computed route R* may be calculated. Said values comprise, for example, the route parking probability r(R*) and the partial expectation of the total travel time $t_e$(R*) and are calculated as provided above by equations (4) and (5).

Further, according to an embodiment, the above-mentioned function $w_p$ (see equation (2)) is defined as follows:

$$w_p(R^*, i) = \begin{cases} 1 & \text{for } i \geq i_p \\ 0 & \text{otherwise} \end{cases} \quad (12)$$

Figure 6A:
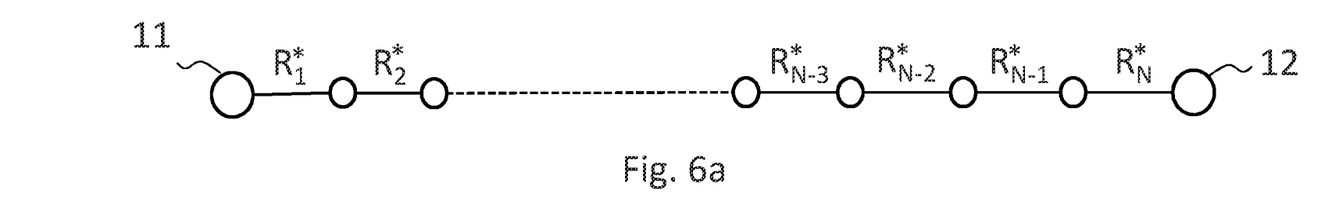
FIGS. 6a, 6b, 6c visualize implementation of the steps for determining routes for routing a vehicle according to an embodiment of the present invention.
Figure 6B:
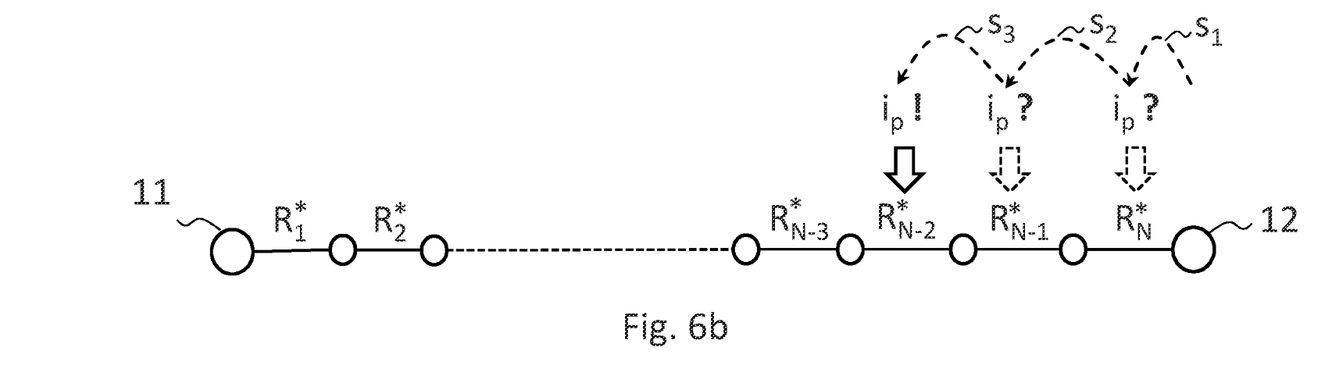

FIGS. 6a and 6b visualize the execution of the steps 51 and 52 according to an embodiment of the present invention. FIG. 6a visualizes the execution of step 51, where a route from the route source 11 to the route destination 12 is calculated/determined as $R^*=\langle R^*_1, \ldots, R^*_N\rangle$. FIG. 6b visualizes the execution of step 52, where the link $R^*_{i_p}$ is searched as an appropriate start link for searching a parking route. Here, the sub-route $R^*_{i_p \ldots N}=\langle R^*_{i_p}, \ldots R^*_N\rangle$ is determined. As shown in FIG. 6b, the search for the appropriate start link is done link-wise starting with the route destination 12 and by moving back in the computed route towards the route source 11. In a first step $s_1$, the last link $R^*_n$ of the computed route is verified with regard to the above-described criteria (see the above equation (11) and the respective description). The criteria are not met in FIG. 6b with regard to the last link $R^*_n$, therefore, the procedure moves in the calculated route one link back towards the route source 11 in step $s_2$, and the predecessor link $R^*_{n-1}$ of the last link $R^*_n$ is considered. Thus, the above-described criteria are verified with regard to the link $R^*_{n-1}$. According to the embodiment of FIG. 6b, the criteria are not met. Therefore, the procedure moves in the calculated route one link back towards the route source 11 in step $s_3$, and the predecessor link $R^*_{n-2}$ of the link $R^*_{n-1}$ is considered. Now, the above-described criteria are verified with regard to the link $R^*_{n-2}$. According to FIG. 6b, link $R^*_{n-2}$ meets the criteria and is determined as the appropriate start link, starting from a starting position of which the parking search is to be started. The sub-route found is thus $R^*_{N-2}=\langle R^*_{N-2}, \ldots, R^*_N\rangle$ in FIG. 6b.

Then after determining, in step 52, the sub-route $R^*_{i_p \ldots N}$ along which the driver shall seek parking, in step 53, the route is further extended beyond the destination. If the sub-route's route parking probability, $r(R^*_{i_p \ldots N})$, is not yet sufficiently large, the route must be extended beyond the destination: starting from the destination link $R^*_N$, we search for a parking route which achieves that the desired threshold for the route parking probability is reached whilst minimizing the expected travel time, comprising driving time from the route source 11 to a parking location and a walk time from the parking location to the route destination 12.

The goal of the search is thus to find an extension R of the route $R^*$ to the destination 12. The search is implemented as an instance of best-first search. Since a route is extended that ends at the destination, the search for a parking route begins with the destination link.

Figure 6C:
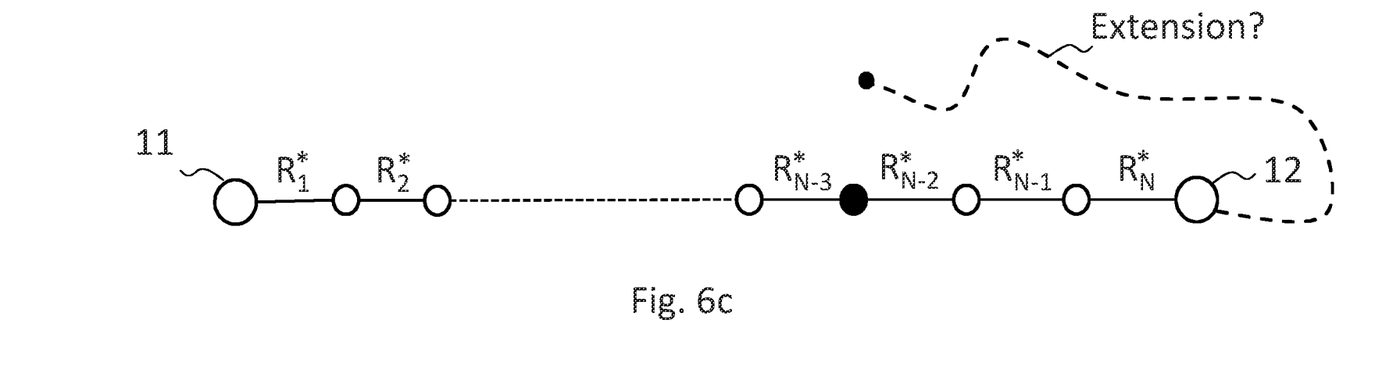

FIG. 6c visualizes the execution of step 53 in view of the previously executed steps 51 (see FIG. 6a) and 52 (see FIG. 6b). The search is executed around the route destination 12, wherein the computed route $R^*=\langle R^*_1, \ldots, R^*_N\rangle$ is extended starting from link $R^*_N$. Here, with regard to each one of the considered extension candidates it is controlled that the route parking probability of the candidate route is equal to or greater than a predetermined threshold for the route parking probability and that a total expected travel time is minimized, wherein the total expected travel time comprises driving time from the route source to a parking location and a walk time from the parking location to the route destination. Minimizing the total expected travel time means controlling that the total expected travel time of an extended computed route is as low as possible among the extended computed route candidates.

The following description considers embodiments for determining/calculating of the parking route, wherein the embodiments may be implemented individually or in arbitrary combinations.

According to an embodiment, the tree search variant of best-first search (e.g., as described above) is used. Thus, starting from the link $R^*_N$, a corresponding search tree 32 as exemplary shown in FIG. 3 is established and used in step 53. According to the embodiment, tree search is applied, because it is desired to allow links to be traversed more than once. Optimal routes during a parking search may very well traverse certain main links in the area several times in order to reach other promising links in the vicinity. Furthermore, it may even be appropriate to re-visit links once enough time has passed if there is usually a high chance of parking on the link (i.e., if the driver of the vehicle had no luck the first time around). According to an embodiment, the function $w_p$ (see equation (2)) is used to model a reduction of the link parking probability for links that were already visited along the current route:

$$w_p(R, i) = \begin{cases} 1 & \text{if } R_i \notin R_{1 \ldots i-1} \\ w_S(R, i) & \text{otherwise} \end{cases} \quad (13)$$

where $w_s$ is a sigmoid function that grows with the time $$dt(R,i)=t_{Drive}(R,i-1)-t_{Drive}(R,\max\{j\in\{1, \ldots, i-1\}|R_j=R_i\}) \quad (14)$$

that has passed since the last traversal of $R_i$. Specifically, $w_s(R, i)$ is defined as follows:

$$w_S(R, i) = \frac{1}{1+\exp(-k(dt(R, i)-dt_0))}, \quad (15)$$

where k is a steepness parameter and $dt_0$ is the inflection point. In an exemplary implementation, the following values were chosen: $k=1/10$ and $dt_0=600$ seconds.

When computing the parking route in step 53, according to an embodiment, the search space is limited to links within the vicinity of the route destination in order to avoid the exploration of useless paths that would lead to excessive walking times. Specifically, a maximum distance $d_{max}^{(2)} \in \mathbb{R}^{30}$ (referred to also as second predetermined threshold) is defined and is used to limit the search space for searching parking routes to the set of links $$\{L \in \mathcal{L} \mid \text{dist}(pos^{\mathcal{L}}_{Start}(L), pos_{Dest}) \leq d_{max}^{(2)} \wedge \text{dist}(pos^{\mathcal{L}}_{End}(L), pos_{Dest}) \leq d_{max}^{(2)}\}, \quad (16)$$

i.e. only links are considered whose start and end locations are within the distance $d_{max}^{(2)}$ around the destination.

For a more rigorous limitation of the search space, according to an embodiment, it is possible to check every link shape point. However, in practice and with regard to the intention to implement an efficient route calculation, the use of the first and last shape point is a reasonable heuristic. In an exemplary implementation, $d_{max}^{(2)}$ was predetermined as being 1000 m. However, also further appropriate distance values may be used as $d_{max}^{(2)}$. According to an embodiment, $d_{max}^{(2)}$ may be set such that an exploration of a larger area may be allowed if necessary, e.g., if the respective search area has only few parking possibilities. The value of $d_{max}^{(2)}$ defines but the boundary of the search space for searching parking routes. The optimal parking route that is ultimately selected will, notably, not make use of the outermost links close to the boundary if lower costs (as defined by the priority function) can be achieved using a route that uses only links close to the destination. Of course, $d_{max}^{(2)}$ can also be used to impose a hard limit which, according to the user's preferences, shall never be exceeded—especially if users have a strong preference for very short walks.

Figure 7:
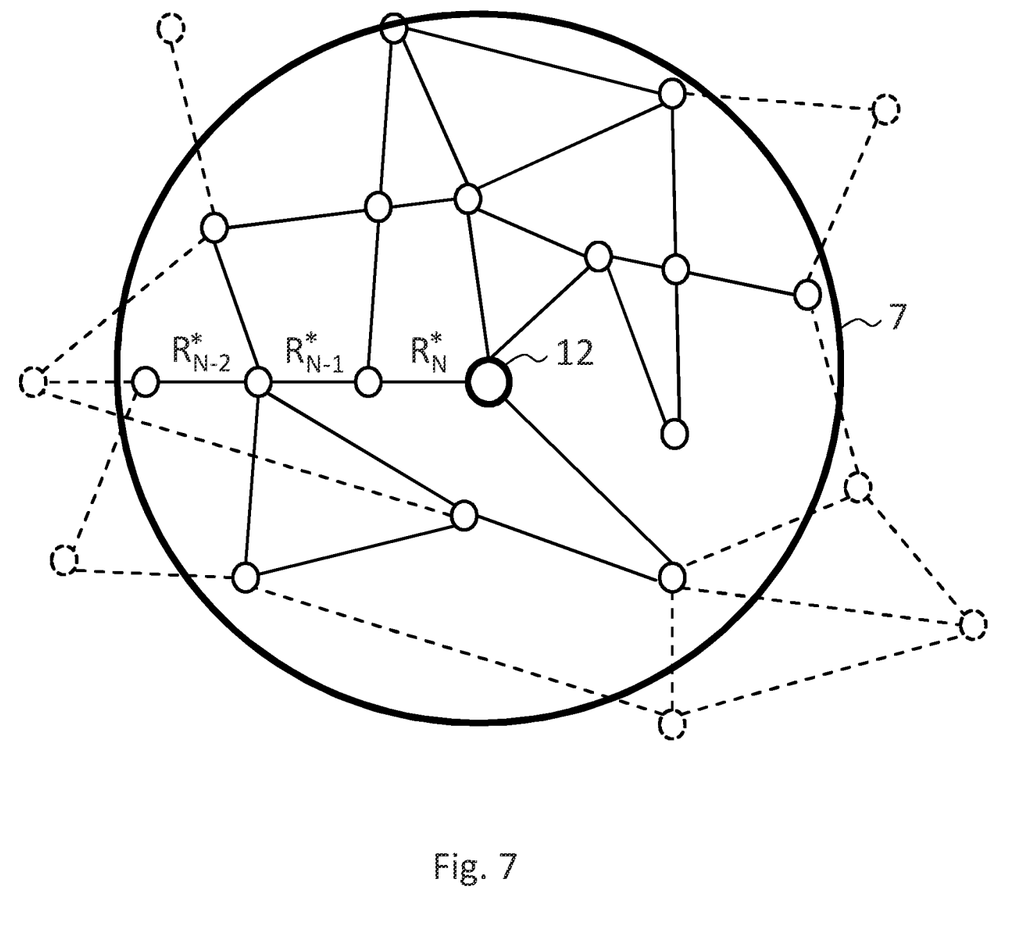
FIG. 7 visualizes implementation of the second predetermined threshold distance according to an embodiment of the present invention.

The implementation of the second predetermined threshold distance or $d_{max}^{(2)}$ respectively is exemplary visualized in FIG. 7. The determined search space is denoted by reference 7 and represented as a circle around the destination node 12 in FIG. 7. Links and nodes taken into consideration for the parking route search are drawn by use of solid lines in FIG. 7, while links and nodes not taken into consideration for the parking route search are drawn by use of dashed lines in FIG. 7.

As mentioned above, the parking route search starts at the route destination 12 and takes into consideration links of the determined search space 7. The initially computed route R* is extended in the search space 7 by use of the links of the search space 7. Thus, a search tree 32, as exemplary shown in FIG. 3, is established based on the links of the search space and starting from the route destination 12. The links of the search space 7 may be traversed more than once for finding a parking place, i.e. may be revisited. This is possible because of the use of the tree search variant of the best-first search.

Figure 8:
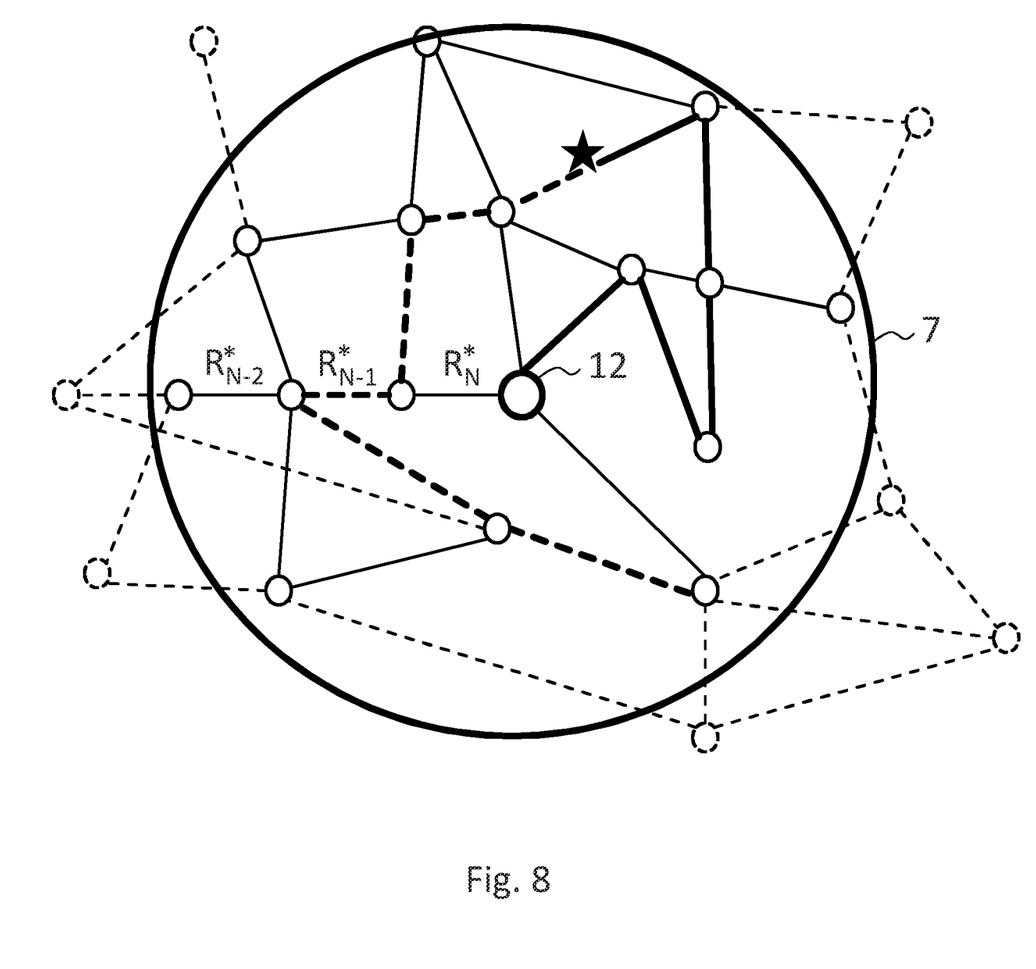
FIG. 8 shows a possible extension of the at first computed route determined according to an embodiment of the present invention based on the search space shown in FIG. 7.

FIG. 8 shows a possible extension R of the initially computed route R*, i.e. a parking route determined with regard to the search space 7 of FIG. 7, which achieves that a parking space is expected to be found along the route with a very high probability, e.g. r(R)=0.999. The extension is indicated by the bold links. The vehicle may be parked at any point along the route, e.g. the location indicated by the star, in which case the bold solid links will be traversed, whereas the bold dashed links will not be. The end of the route is, notably, reached only if no parking space can be found on the entire route, which is expected to occur, in this case, with a very low probability of 0.001.

When executing parking route search, according to an embodiment, the goal of the corresponding routing problem is to reach a very high route parking probability. Hence, the goal test is simply:

$$r(R) \geq 1-\varepsilon \quad (17)$$

for some small $\varepsilon \in \mathbb{R}^+$. When computing the parking route, it is controlled that the extended route meets the criteria of equation (17) among the extended route candidates.

According to an embodiment, a priority function $f(R)$ is used to control the order, in which potential parking routes are considered and subsequently extended. In conjunction with the goal test, the function thus critically determines the search result, since the route R found is the one with the smallest value $f(R)$ among the ones where the goal condition $r(R) \geq 1-\varepsilon$ is satisfied. Therefore, function $f$ should be viewed as a cost function, where low costs should ideally correspond to a low expected travel time, as the goal is to minimize the total travel time encompassing drive time as well as foot walk time.

Since the application of tree search on a graph structure results in an infinite search tree, the fringe may become excessively large before the goal is reached. Therefore, when executing the parking route search, according to an embodiment, fringe truncation is applied. The subset of the retained fringe elements should not be arbitrary. Therefore, according to an embodiment, parking routes are kept that are closest to the goal, i.e. the routes where r(R) is largest, as this will reduce the chances of removing an element that may ultimately have become the best route. Thereby, the search is focused on promising regions of the search space, and the efficiency of the parking route calculation is increased.

Further, the computing and storage resources are limited. Negative side-effects can be kept to a minimum as long as excessive truncations are avoided. For this purpose, a desired fringe size $N_F$ is introduced. In order to allow the search space to be explored freely to some degree even if $N_F$ has been reached, the pruning is not done immediately. Instead, the fringe is pruned back to $N_F$ as soon as the fringe size exceeds 1.5 $N_T$. According to an embodiment, the fringe, which is implemented as a priority queue, is pruned by copying its contents to an array, sorting the array according to r(·) and then constructing a new priority queue from the first $N_F$ entries. According to another embodiment, the fringe is implemented based on two cross-referencing binary search trees—one ordered according to $f(·)$, one ordered according to r(·), where every entry in one tree has a pointer to the corresponding entry in the other. Finding the "worst" entry according to r(·) and removing it in both trees are then operations with a time complexity that is logarithmic in the size of the fringe. Thus, an even more efficient solution is achieved by the other embodiment.

Although it is not possible to apply a standard closed list in the tree search-based approach (the use of the closed list has been described above with regard to the best-first search), pruning can still be applied in order to prevent the further expansion of paths that are guaranteed to be or at least are very likely to be irrelevant. Specifically, according to an embodiment, the addition of any route R to the fringe is prevented if previously another route R' has been visited that reaches the same link in the same direction and that is associated with a route parking probability at least as high as that of R, i.e. a further expansion of R is prevented if there is a previously visited route R' such that $$R_{|R|} = R'_{|R|} \wedge dir(R, |R|) = dir(R', |R'|) \wedge r(R') \geq r(R). \quad (18)$$

Since R' was visited before R, $f(R') \leq f(R)$, and therefore R' is a route that is at least as good as R with respect to the cost function and reaches the same geographic location with a route parking probability at least as high as that of R. This constitutes an effective optimization, as it helps to avoid the exploration of paths that are very likely to be irrelevant because the previously found route R' is likely to develop in an equivalent way, yet with costs that are better or at least as good.

In the following, different priority functions will be considered, which according to the embodiments of the present invention may be applied for executing the parking route search.

Partial expectation of the travel time (referred to also as "expected trip duration", ETD) could be used as the priority function:

$$f_{ETD}(R) = t_e(R) \quad (19)$$

The use of the priority function $f_{ETD}$ would straightforwardly achieve that the route that is found will be the one with the smallest expected travel time. If there are no side-effects to fringe truncations, the use of the function $f_{ETD}$ will guarantee that the determined route is globally optimal under the assumption that the individual parking probabilities are correct.

According to an embodiment, in the spirit of A* search, a term is thus added to the partial expectation of the travel time such that the sum represents a lower bound on the full expectation of the travel time that would result if the route was extended to reach a route parking probability of 1. A suitable heuristic for the additional expected travel time that will result from any extension of a route R is the following lower bound on the expected travel time:

$$t_e^+(R)=(1-r(R))\cdot t_{Drive}(R,|R|). \quad (20)$$

The heuristic is admissible (underestimates the true expectation), as it is assumed that no additional drive time applies and as it is furthermore assumed that the foot walk time required to reach the destination for all route elements that may be added beyond the current route is zero. It is noted that a non-zero foot walk time is not included into the heuristic, because route extensions could take the vehicle closer to the destination. The cost function is as follows:

$$f_{ETD}^+(R)=t_e(R)+t_e^+(R). \quad (21)$$

The additional term resolves the fundamental problem of $f_{ETD}$ being a poor cost function. For the case where $t_e(R)$ does not increase or increases only marginally (because the route parking probability is zero or very small), $t_e^+(R)$ does increase, resolving this most critical issue.

According to another embodiment, the priority function is defined such that its priority values correspond to costs incurred for not arriving/not yet having been able to park the vehicle. Specifically, the notion of time wasted by traversing a link is applied. Traversing a link takes time, and some of that time—depending on the probability that the vehicle can actually park on the link—will be wasted. Not only drive time is wasted but, if the link takes the vehicle further away from the destination, also some foot walk time may be wasted, as it will subsequently take us longer than before to reach the destination. Therefore, the priority function is defined as:

$$f_{DTW}(R)=\Sigma_{i=1}^{|R|}(1-q(R,i))(t_{Drive}^{\pounds}(R_i)+\max\{0,\Delta t_{Foot}(R,i)\}) \quad (22)$$

where $$\Delta t_{Foot}(R,i)=t_{Foot}(pos_{End}(R,i))-t_{Foot}(pos_{Start}(R,i)) \quad (23)$$

According to the present embodiment q(R, i) rather used than p(R, i), because this achieves that high route link parking probabilities in early parts of the route will have a stronger impact. The reason for not admitting negative values for $\Delta t_{Foot}$ in equation (22) is that the search would otherwise prefer links with a low link parking probability, i.e. low p(R, i), for the case where the vehicle gets closer to the destination. However, the assertion that driver of the vehicle desires parking as early as possible always is a priority, and moving closer to the destination is still effectively "rewarded" by not penalizing it.

According to another embodiment, the following priority function is utilized:

$$f_{PTW}(R)=\Sigma_{i=1}^{|R|}(1-p(R,i))(t_{Drive}^{\pounds}(R_i)+t_{Foot}(pos_{End}(R,i))), \quad (24)$$

which pessimistically assumes that the time required to walk from the end of the traversed link applies whenever there is no possibility to park on the link, thus strongly favoring links in the vicinity of the destination. Here, PTW denotes the expression "pessimistic time wasted". Here, the link parking probability p(R, i) is used instead of the route link parking probability q(R, i), because, costs already being pessimistically biased towards closeness to the destination, no need to inflate costs for route elements appearing further down the road is present. It is to be noted that, given that link $R_i$ is traversed, the probability of being able to park there is p(R, i).

It has to be noted that any of the embodiments and features of any of the embodiments, described herein, may be combined with each other, unless a combination is explicitly excluded.

Thus, the present invention is directed to a method and to a device for determining routes for routing a vehicle, which takes the search for parking space near the destination into account. Based on given probabilities of there being free parking spaces on individual links in a digital map, the method executes the following steps: computing, in a digital map, a route from a route source to a route destination; determining a sub-route of the computed route, which ends at the destination and along which the vehicle could be parked; and extending the computed route beyond the route destination in an area around the route destination until a route parking probability of a parking route, comprising links of the determined sub-route and/or of the extension of the computed route, is equal to or greater than a predetermined threshold whilst a total expected travel time, associated with the extended computed route and comprising driving and walking times, is minimized, wherein the route parking probability is the probability that parking at some point along the extended computed route will be possible and wherein one or more links of the parking route are suitable for parking.

Additionally, also other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for determining routes for routing a vehicle, the method comprising:
   computing, in a digital map, a route from a route source to a route destination;
   determining a sub-route of the computed route, which ends at the destination and along which the vehicle could be parked; and
   extending the computed route beyond the route destination in an area around the route destination until a route parking probability of a parking route, comprising links of the determined sub-route and/or of the extension of the computed route, is equal to or greater than a predetermined threshold whilst a total expected travel time, associated with the extended computed route and comprising driving and walking times, is minimized, wherein the route parking probability is the probability that parking at some point along the extended computed route will be possible and wherein one or more links of the parking route are suitable for parking.

2. The method according to claim 1, wherein the total expected travel time is a probabilistic expectation comprised of driving times from the route source to potential parking locations and walking times from the potential parking locations to the route destination.

3. The method according to claim 1,
   wherein the determining of the sub-route comprises starting at the route destination and link-wise moving back in the computed route towards the route source,
   wherein, when link-wise moving back in the computed route, at each corresponding link of the computed route, a respective route parking probability of being able to park at some point along the computed route from the corresponding link to the destination and a respective distance from a predecessor of the corresponding link in the computed route to the route destination are computed, wherein the link-wise moving back is terminated and the corresponding link is selected as an appropriate start link of the sub-route if the respective route parking probability is greater than or equal to a desired route parking probability or if the respective distance is greater than a first predetermined threshold distance.

4. The method according to claim 1, wherein the extending of the computed route is executed based on a tree search variant of a best-first search.

5. The method according to claim 1, wherein the extending of the computed route is executed starting from the route destination.

6. The method according to claim 1, wherein the extending of the computed route comprises limiting a search space in the digital map to links around the route destination.

7. The method according to claim 6, wherein the limiting of the search space in the digital map to links around the route destination comprises limiting to links whose start positions and end positions are within a second predetermined threshold distance of the route destination.

8. The method according to claim 1, wherein a computing of the route parking probability comprises reducing a link parking probability of a link if it has been previously used within the same parking route, the reduction depending on the time that has passed since the last usage.

9. The method according to claim 1, wherein the route parking probability being a probability of parking at some point along the parking route R, is determined as follows:

$$r(R) = \sum_{i=1}^{|R|} q(R, i),$$

wherein |R| denotes a number of links of the parking route R, and q(R, i) denotes a route link parking probability that, when traveling along the parking route R, the vehicle will be parked on the i-th link of the parking route R.

10. The method according to claim 9, wherein the route link parking probability q(R, i) that, when traveling along the parking route R, the vehicle will be parked on the i-th link of the parking route R is determined as follows:

$$q(R, i) = p(R, i) \prod_{j=1}^{i-1} (1 - p(R, j)),$$

wherein p(R, i) denotes a link parking probability that a parking space will be available on the i-th link of the parking route R, and wherein p(R, j) denotes a link parking probability that a parking space will be available on the j-th link of the parking route R.

11. The method according to claim 10, wherein the link parking probability that a parking space is available and considered usable on the i-th link is determined as follows, $$p(R,i) = p_{R_i} w_p(R,i),$$

wherein $p_{R_i}$ denotes the probability with which a free parking space is expected to be available on the i-th link of route R, and wherein $w_p(R, i)$ indicates the degree to which the probability $p_{R_i}$ should be applied with regard to the route.

12. The method according to claim 1, wherein the extending of the computed route comprises applying a priority function $f(R)$ for a best-first search, which, by defining the order in which candidate routes are considered during the search, guides the search in order to find routes with short total travel times, the total travel times including both the drive time and the walk time from the potential parking locations to the route destination.

13. The method according to claim 12, wherein a value of the priority function $f(R)$ is a lower bound on the expected travel duration of all extensions of route R, such as $$f(R) = \sum_{i=1}^{|R|} q(R, i)(t_{DrivePark}(R, i) + t_{Foot}(R, i)) + (1 - r(R))t_{Drive}(R, |R|),$$

wherein $t_{DrivePark}(R, i)$ is the total travel time on route R for the case where the vehicle is assumed to park on the i-th link, $t_{Foot}(R, i)$ is the walk time from the i-th link in R to the route destination and $t_{Drive}(R|R|)$ is the drive time required for the entire route R.

14. The method according to claim 12, wherein a value of the priority function $f(R)$ is an estimate of time expected to be wasted when choosing route R, such as $$f(R) = \sum_{i=1}^{|R|} (1 - p(R, i))(t_{Drive}(R, i) - t_{Drive}(R, i-1) + t_{Foot}(R, i)),$$

wherein $t_{Drive}(R, i)$ is the drive time on route R up to the end of the i-th link, wherein $t_{Drive}(R,0)$ is defined to be 0 for all R, wherein $t_{Foot}(R, i)$ is the walk time from the the i-th link in R to the route destination.

15. The method according to claim 1, wherein the extending of the computed route comprises truncating a fringe of a best-first search, wherein the fringe comprises a set of candidate routes that could be explored next, and wherein the truncating of the fringe comprises deleting routes from the fringe that are associated with a lowest route parking probability, if the set of nodes of the fringe is larger than a predetermined fringe size threshold.

16. The method according to claim 15, wherein the extending of the computed route comprises omitting a consideration of a potential route R and preventing an addition of the potential route R to the fringe if another route has been previously found which ends in the same point as R and is associated with a route parking probability that is at least as high as the route parking probability of the potential route R.

17. A device configured to determine routes for routing a vehicle, wherein the device is further configured to execute the method according to claim 1.

* * * * *